United States Patent [19]
Edler

[11] Patent Number: 5,364,608
[45] Date of Patent: Nov. 15, 1994

[54] METHOD OF CONVERTING A SILICON NITRIDE FROM ALPHA-PHASE TO BETA-PHASE, APPARATUS USED THEREFOR, AND SILICON NITRIDE MATERIAL MADE THEREFROM

[75] Inventor: James P. Edler, Troy, Mich.

[73] Assignee: Eaton Corporation, Cleveland, Ohio

[21] Appl. No.: 100,507

[22] Filed: Jul. 30, 1993

[51] Int. Cl.5 ............................................. C04B 35/58
[52] U.S. Cl. ...................................... 423/344; 501/97; 264/65; 264/66
[58] Field of Search ............... 501/96, 97, 98; 264/65, 264/66; 423/344, 345

[56] References Cited

U.S. PATENT DOCUMENTS

| | | | |
|---|---|---|---|
| 4,218,257 | 8/1980 | Oda et al. | 501/97 |
| 4,652,276 | 3/1987 | Burden | 51/308 |
| 4,692,419 | 9/1987 | Watsui et al. | 501/97 |
| 4,920,085 | 4/1990 | Yoshida et al. | 501/97 |
| 5,002,907 | 3/1991 | Hayakawa et al. | 501/97 |
| 5,055,432 | 10/1991 | Edler et al. | 501/97 |
| 5,085,582 | 2/1992 | Edler et al. | 432/156 |
| 5,094,986 | 3/1992 | Matsumoto et al. | 501/97 |
| 5,114,888 | 5/1992 | Mizuno et al. | 501/96 |
| 5,120,685 | 6/1992 | Quadir et al. | 501/97 |
| 5,126,295 | 6/1992 | Uchino et al. | 501/97 |
| 5,139,720 | 8/1992 | Takeda et al. | 264/66 |
| 5,144,693 | 5/1992 | Hintermayer et al. | 423/344 |
| 5,156,830 | 10/1992 | Edler et al. | 423/444 |
| 5,219,500 | 6/1993 | Yoshida et al. | 264/65 |

Primary Examiner—Mark L. Bell
Assistant Examiner—A. Wright
Attorney, Agent, or Firm—Paul S. Rulon; Lynn E. Cargill

[57] ABSTRACT

A method of converting non-densified alpha-phase silicon nitride to beta-phase silicon nitride which includes heating a walled container enclosing a non-densified alpha-phase silicon nitride mass to an elevated temperature for a sufficient length of time so that the non-densified alpha-phase silicon nitride mass converts to a beta-phase silicon nitride mass. The walled container is formed of a silicon nitride-containing material which is stable at temperatures of at least 1700° C. and is compatible with silicon nitride. Additionally, the walled container has an opening therein to allow placement of the non-densified alpha-phase silicon nitride mass therein.

20 Claims, 3 Drawing Sheets

METHOD OF CONVERTING A SILICON NITRIDE FROM ALPHA-PHASE TO BETA-PHASE, APPARATUS USED THEREFOR, AND SILICON NITRIDE MATERIAL MADE THEREFROM

TECHNICAL FIELD

This invention relates to a method of converting alpha-phase silicon nitride to beta-phase silicon nitride, an apparatus used therefor, and the silicon nitride made thereby.

BACKGROUND OF THE INVENTION

Generally, sintered silicon nitride has been manufactured in batch operations by first placing a silicon nitride article in a refractory material container, formed typically of graphite. A setter powder of silicon nitride or boron nitride or a mixture thereof is then poured into the container to cover the silicon nitride articles being sintered to protect them from thermal decomposition and reaction with the furnace materials. The setter powder-covered silicon nitride article is then placed in a batch-type furnace to sinter the silicon nitride. Without this protection, experience has shown that a silicon nitride article will decompose at temperatures above 1700° C. in part to silicon and nitrogen. Furthermore, the silicon nitride article will react with the carbon in the graphite to form silicon carbide, which is thermodynamically stable at temperatures above 1700° C., causing warping of the silicon nitride article. In contrast, when setter powder is used, the powder itself decomposes due to the high temperature in the furnace and the powder reacts preferentially with the furnace material instead of the silicon nitride article.

For economical reasons and optimum product quality, it is highly desirable to prepare sintered silicon nitride in a continuous process. Although silicon nitride could be sintered in continuous furnaces using setter powder in the above-described method, this method has been found to be undesirable. Firstly, the setter powder must be cleaned off the article after sintering, adding a step in the procedure. At times, the powder on a silicon nitride article sinters together or sinters to the article, thus, requiring excessive force to remove the sintered material. In some of these instances, the sintered setter powder cannot be removed even with force, and the article must be scrapped.

In addition, use of the setter powder is costly, as recycling of the setter powder is not without its problems. During use, there is inherent loss of setter powder (due to spillage, etc.). It has been known to lose as much powder in weight as the silicon nitride article itself. Furthermore, during recycling, often the setter powder needs to be crushed and screened to breakup the sintered pieces before reusing, adding yet another step in the manufacturing procedure.

Yttria or other densification agents are sometimes added to the setter powder, because, if the silicon nitride article contains these densification agents, the densification agents are "robbed" from the article by the setter powder during sintering unless the setter powder also contains the agents. In instances when densification agents are added to the setter powder, the setter powder typically is chemically analyzed to ensure that the required amounts of densification agents are present in the proper amounts. The analysis adds yet another step and additional complications to the manufacturing operation.

During sintering, the silicon nitride converts from a non-densified predominantly alpha-phase silicon nitride to a densified beta-phase silicon nitride. The present inventor has discovered that predominantly alpha-phase silicon nitride compositions free of densification aids can advantageously be converted to non-densified predominantly beta-phase silicon nitride by subjecting alpha-phase silicon nitride to sintering conditions.

It is also desirable to have available an improved silicon nitride material, one which is more consistent in physical and chemical properties throughout the bulk of the material and one which is high in strength.

It is, therefore, an object of the present invention to provide an economical method of converting alpha-phase silicon nitride to beta-phase silicon nitride which inhibits the silicon nitride from thermally decomposing or being adversely effected by furnace materials during conversion without using setter powder.

It is another object of the present invention to provide a method of converting alpha-phase silicon nitride to beta-phase silicon nitride which gives protective coverage to the silicon nitride during the conversion operation and which is easy to use, readily reusable, and which does not require any additional steps of operation.

It is yet another object of the present invention to provide a commercially-viable method for the continuous conversion of alpha-phase silicon nitride to beta-phase silicon nitride without experiencing the problems of using setter powder.

It is also another object of the present invention to provide a method for the continuous conversion of alpha-phase silicon nitride to beta-phase silicon nitride using conventional continuous furnaces.

It is yet another object of the present invention to provide a furnace for converting alpha-phase silicon nitride to beta-phase silicon nitride without the above-discussed problems.

It is another object of the present invention to provide an improved silicon nitride material which has more consistent properties throughout the bulk of the material and which has a high strength.

SUMMARY OF THE INVENTION

In accordance with preferred embodiments of the invention, these and other objects and advantages are addressed as follows.

One embodiment of the invention entails a method of converting non-densified predominantly alpha-phase silicon nitride to predominantly beta-phase silicon nitride. The method includes heating a walled container enclosing a non-densified predominantly alpha-phase silicon nitride mass to an elevated temperature for a sufficient length of time so that the non-densified predominantly alpha-phase silicon nitride mass converts to a predominantly beta-phase silicon nitride mass. The walled container is formed of a silicon nitride-containing material which is stable at temperatures of at least 1700° C. and is compatible with silicon nitride. Additionally, the walled container has an opening therein to allow placement of the non-densified predominantly alpha-phase silicon nitride mass therein.

A second embodiment of the invention entails a furnace for converting silicon nitride from a predominantly alpha-phase material to a predominantly beta-phase material which inhibits the silicon nitride from thermally decomposing or being adversely effected by the furnace interior. The furnace includes a) an interior conversion zone having a lining formed of a silicon nitride-containing material which is stable at temperatures of at least about 1700° C. and is compatible with silicon nitride; b) means for heating the interior conversion zone to a temperature of at least about 1700° C.; and c) means for providing a selected gas into the atmosphere of the interior conversion zone. The methods of this invention may be performed in the absence of using setter powder.

In a more specific embodiment, the furnace has an interior nitriding zone located in operational sequence before the conversion zone; means for heating the interior nitriding zone to a temperature of from about 1350° to about 1450° C.; an interior burn-off zone located in operation sequence before the nitriding zone; means for heating the burn-off zone to a temperature of up to about 1000° C.; an interior low-temperature zone located in operational sequence after the conversion zone; means for heating the low-temperature zone to a temperature above 25° C. and less than the temperature of the conversion zone; an interior post-conversion heat treatment zone located in operational sequence after the low-temperature zone; means for heating the post-conversion heat treatment zone to a temperature of at least about 1500° C.; and an interior cooling zone located in operational sequence after the interior post-conversion heat treatment zone.

It is known that, to some degree, silicon nitride decomposes to silicon and nitrogen at temperatures above 1700° C. and one atmosphere of nitrogen pressure. In the methods of this invention, chemical equilibrium in the conversion zone of the furnace is achieved by the silicon nitride-containing material which forms the walled container or the furnace lining decomposing preferentially over the silicon nitride mass being processed. The chemical equilibrium of the decomposition reaction:

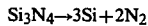

$$Si_3N_4 \rightarrow 3Si + 2N_2$$

is achieved readily by the decomposition of the silicon nitride-containing material in the walled container or furnace lining. Other materials, such as boron nitride, would not help to achieve the reaction equilibrium. In addition, the walled container or furnace lining reaches a slightly higher temperature than does the silicon nitride mass being processed, thereby aiding the sacrificial decomposition reaction.

The methods and apparatus of this invention can benefit from the teachings of U.S. Pat. Nos. 4,943,401; 5,055,432; 5,079,198; 5,156,830; 5,160,719; and 5,166,106; U.S. patent application Ser. No. 558,109 filed on Jul. 24, 1990; U.S. patent application Ser. No. 557,371 filed on Jul. 24, 1990; U.S. patent application Ser. No. 557,382 filed Jul. 24, 1990; U.S. patent application Ser. No. 972,870 filed on Nov. 3, 1992; and U.S. patent application Ser. No. 963,534 filed Oct. 20, 1992. These patents and patent applications are to inventor Edler or to inventors Edler and Lisowsky and are hereby incorporated by reference.

Yet another embodiment of this invention includes a ceramic silicon nitride material comprising predominantly beta-phase silicon nitride bulk material having long-range consistent physical properties throughout the bulk such that the material exhibits a minimum average strength in four point bending when tested in accordance with ASTM C1161 specimen size B, of about 450 MPa (65 KSI) and a Weibul slope of at least 20. The Weibul slope is determined using a minimum of 30 test bars of the silicon nitride material.

BRIEF DESCRIPTION OF THE DRAWINGS

The nature and extent of the present invention will be clear from the following detailed description of the particular embodiments thereof, taken in conjunction with the appended drawings, in which.

DETAILED DESCRIPTION OF THE INVENTION

Figure 1:
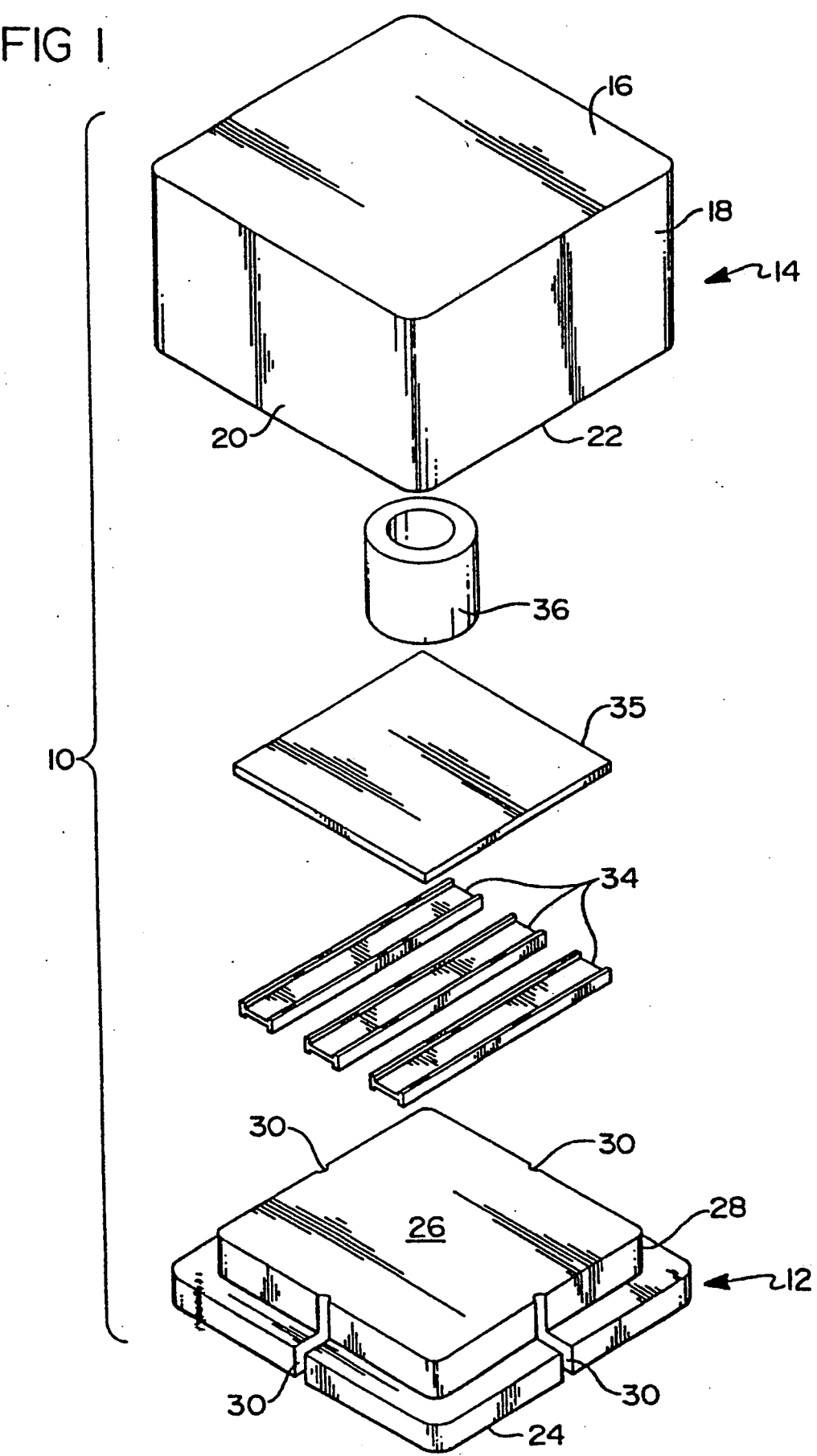
FIG. 1 shows an exploded perspective view of a sinter box which may be used in the method of the present invention, the sinter box being shown with a silicon nitride article positioned between the lid of the sinter box and a flat support piece.

One method of the present invention generally entails converting non-densified predominantly alpha-phase silicon nitride to predominantly beta-phase silicon nitride, which includes heating a walled container enclosing a non-densified predominantly alpha-phase silicon nitride mass to an elevated temperature for a sufficient length of time so that the non-densified predominantly alpha-phase silicon nitride mass converts to a predominantly beta-phase silicon nitride mass. The walled container is formed of a silicon nitride-containing material which is stable at temperatures of at least 1700° C. and is compatible with silicon nitride. Additionally, the walled container has an opening therein to allow placement of the non-densified alpha-phase silicon nitride mass therein.

In the method of this invention, the elevated temperature is preferably from about 1700° C. to about 1900° C. The sufficient length of time to convert the alpha-phase silicon nitride to beta-phase silicon nitride is typically from about 20 to about 500 minutes.

The Alpha-Phase Silicon Nitride Mass

The alpha-phase silicon nitride mass employed in the methods of this invention is considered to be predominantly alpha-phase. The term "predominantly", used in this context, means that at least 70 volume percent based on the weight of the silicon nitride present. The alpha-phase silicon nitride mass used in the present invention may be prepared before placing it into the walled container or it may be prepared by nitriding silicon which has been placed in the walled container.

If the silicon nitride mass is prepared by nitriding silicon which has been placed in the container, the nitriding may be performed on silicon powder or on a silicon greenware article. Certain additives, such as nitriding agents, densification aids, organic binders and the like may be added to the silicon powder or greenware article before nitriding. These additives may include at least one nitriding agent added at about 0.1 to 7 volume percent based upon the volume of the silicon to aid in the nitriding process. The at least one nitriding agent may be selected from the group consisting of iron oxides, lead oxides, nickel carbonyl, nickel oxides, silicon carbide, graphite, carbon, aluminum oxides, CoO, CaF, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, alpha-phase $Si_3N_4$ and mixtures thereof.

As mentioned, the additives may also include at least one densification aid which may be employed in an amount to achieve 4 to 16 volume percent based on the volume of the silicon nitride formed during nitridation. The densification aid may be selected from the group consisting of alumina, rare earth metal oxides, yttrium oxide, magnesium oxide, zirconium oxide, lanthanum oxide, titanium oxide, barium oxide, strontium oxide, cerium oxide, scandium oxide, boron oxide, beryllium oxide, chromium oxide, calcium oxide, vanadium oxide, manganese oxide, magnesium nitride, aluminum nitride, MgSi, $MgAl_2O_4$, and mixtures thereof.

In a preferred embodiment, the silicon nitride compositions contain ceria, which has been found to be a low-temperature densification aid, allowing the conversion and densification to occur at temperatures of about 1720° C. in a nitrogen atmosphere with a nitrogen partial pressure of about 100 KPa (atmospheric pressure at sea level), which is the desired operating pressure of many furnaces. In comparison, compositions containing yttria require conversion and densification temperatures of 1800°–1850° C. with substantial nitrogen overpressures. Nitrogen overpressures of 300–2050 KPa (45–300 psig) are not uncommon, therefore requiring furnaces which are designed for use at temperatures above 1800° C. and high pressures.

To form a greenware article of silicon or silicon nitride, dry silicon or silicon nitride may be isopressed or dry compressed using standard powder metal presses or a slurry of silicon or silicon nitride may be slip cast, extruded or injection molded. If binders are included in the greenware article, the compact will have a sufficient strength to allow machining without the need for special heat treatments such as partially nitriding the silicon or sintering the silicon compact. Preferably, required machining is completed on the silicon greenware article prior to nitriding, rather than on the harder silicon nitride part.

Whether the silicon is nitrided before or after placement into the walled container, the silicon nitride mass to be sintered may be powdered silicon nitride or may be silicon nitride that has been formed into a greenware article. When the unsintered silicon nitride mass is in powder form and placed into a walled container, upon sintering, the silicon nitride powder will take on the form of the interior of the container.

The Walled Container

Figure 2:
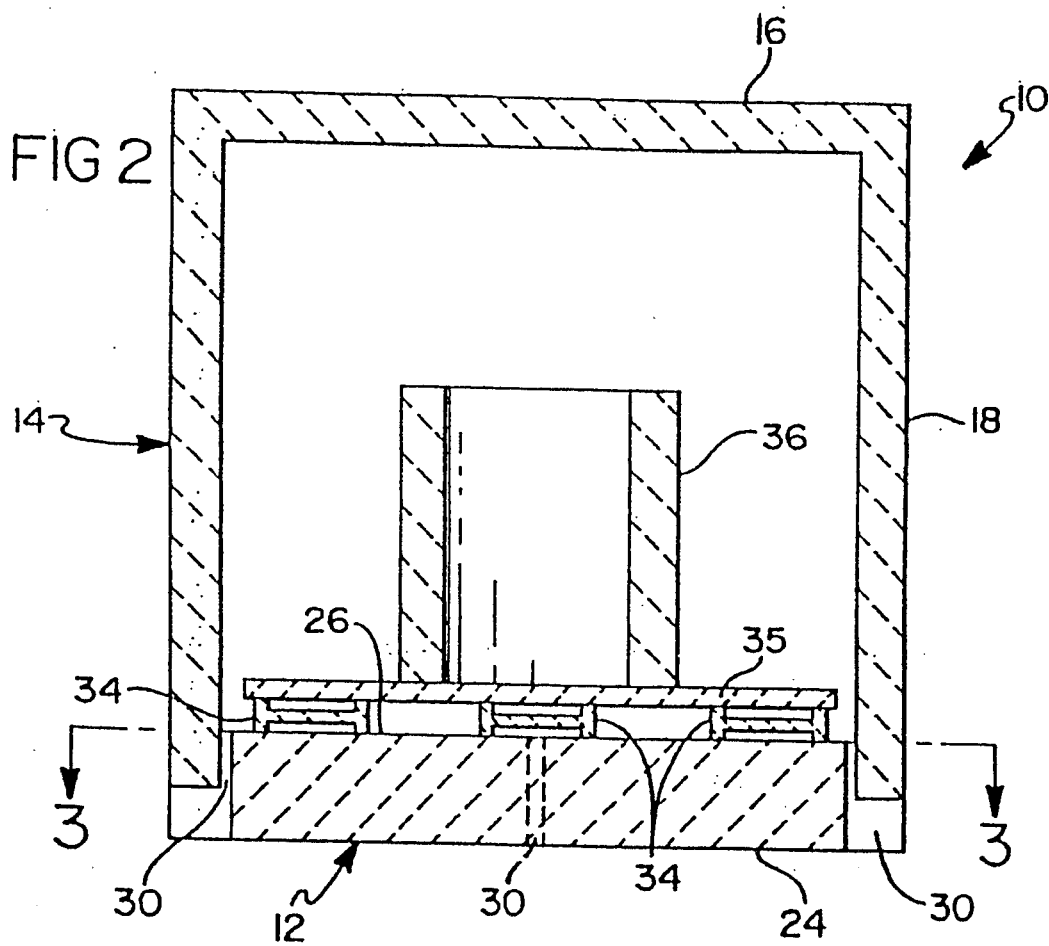
FIG. 2 shows a cross-sectional side view of an assembled sinter box which may be used in the method of the present invention, which sinter box is shown cut in half vertically by cutting perpendicular to two sides of the sinter box, further showing elongated support pieces, a flat support plate, and a silicon nitride article as positioned in place within the sinter box.
Figure 3:
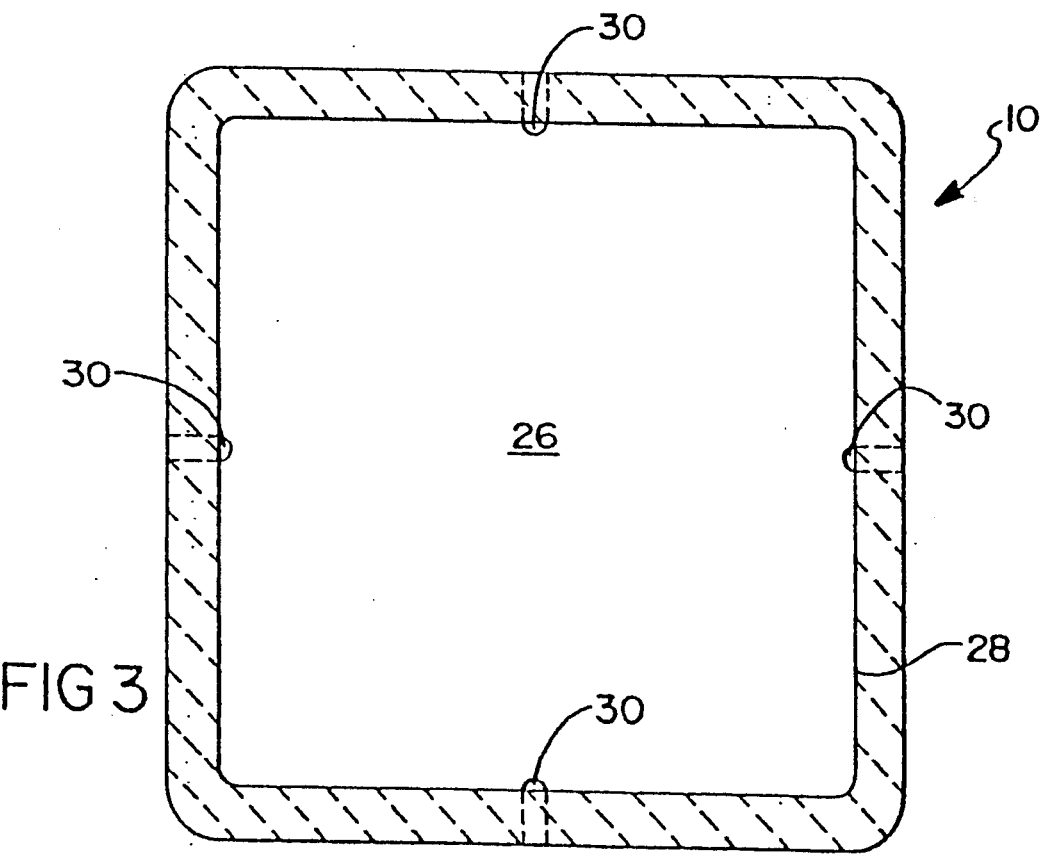
FIG. 3 shows a cross-sectional view of a sinter box which may be used in the present invention, which cross section is taken along lines 3—3 of FIG. 2.

The walled container is a container usable in a furnace for converting alpha-phase silicon nitride to beta-phase silicon nitride such that the walled container fits inside the furnace and affords protection to the silicon nitride mass being converted by enclosing it and protecting the silicon nitride mass from contact or exposure to the furnace refractories thereby preventing unwanted chemical reactions between the silicon nitride mass and the furnace materials. The walled container used in this invention may be the walled container disclosed in U.S. Pat. No. 5,085,582 to Edler, which patent is hereby incorporated by reference. The walled container described in the Edler patent is shown in FIGS. 1–3 and described as follows.

Referring first to FIG. 1, one embodiment of the walled container useful for this invention is shown as a sinter box generally denoted by the numeral 10. Sinter box 10 is shown comprising a flat support piece referred to as base 12 and box-shaped lid 14. Lid 14 includes top wall 16 and four vertical side walls 18 and 20 substantially perpendicular to top wall 16. At the bottom of lid 14 is bottom opening 22 as defined by the bottom edges of side walls 18 and 20.

Base 12 is shown as having flat bottom ridge 24 for receiving lid 14 and platform 26 thereupon onto which silicon or silicon nitride article 36 is placed for nitriding, if necessary, and for converting from alpha-phase to beta-phase. In practice, article 36 is placed in sinter box 10, and then the sinter box is placed into a furnace for nitriding, if necessary, and conversion. Platform 28 has flat upper surface 26 which is dimensioned to fit within and under bottom opening 22 of lid 14. Preferably the fit of platform 28 into opening 22 is such that lid 14 is easily placed on base 12 with little or no force.

Preferably, the walled container is designed so that the opening is closeable and, when closed, a passage remains in the walled container for gaseous communication between the inside and the outside of the container. As shown in FIG. 1, base 12 includes four slits 30 extending upwardly through bottom ridge 24 and platform 26, one on each side. Slits 30 provide atmospheric communication between the inside of sinter box 10 and the atmosphere within the furnace when closed, thereby allowing gases to flow in and out of sinter box 10 during nitriding, if performed, and conversion. The atmospheric communication is important when the sinter box is in a furnace in which the atmospheric pressure is changed by pressurization or evacuation to create a partial vacuum.

The atmospheric communication between inside and outside the sinter box can be accomplished in various ways. For example, there may be slits in the edges of the side walls at the opening of lid 14 rather than having slits in base 12. Alternatively, it is contemplated that lid 14 may have a few small holes extending through the side walls. Any such openings or gaps between the lid and the base will suffice so long as they are small enough so as to avoid thermal decomposition of the silicon nitride article and small enough to substantially inhibit reaction between the silicon nitride article with the furnace materials during conversion. However, the openings must be large enough to allow for gas exchanges and atmospheric pressure changes within the box without exploding the lid off (during decreasing pressure outside the box) or imploding the sinter box (during increasing pressure outside the box).

Referring again to FIG. 1, three elongated support pieces 34 are shown between base 12 and flat support plate 35. In position, elongated support pieces 34 rest on flat upper surface 26, and flat support plate 35, in turn, rests on elongated support pieces 34. Elongated support pieces 34 and flat support plate 35 may be used to support article 36, although the silicon nitride article 36 may rest directly on platform 28 without using either support pieces 34 or support plate 35. It has been found, though, that the elongated support pieces 34 and flat support plate 35 provide a useful means for separating article 36 from base 12 during sintering to help assure no "gluing" of article 36 to base 12 which may occur during the conversion operation.

Looking now to FIG. 2, there is illustrated a cross-sectional view of sinter box 10 of FIG. 1 containing article 36 as cut in half vertically and perpendicular to two sides of the sinter box. The same reference numerals are used in FIGS. 1, 2 and 3.

FIG. 3 illustrates a cross-sectional view of sinter box 10 as taken along lines 3—3 of FIG. 2 and clearly shows detail of the bottom of the sinter box.

The sinter box and optional elongated support pieces and flat support plate may be formed of a silicon nitride-containing material which is stable at a temperature of at least 1700° C. and is compatible with the silicon nitride mass either before or after conversion from alpha-phase to beta-phase. The phrase "compatible with silicon nitride" is used to mean that the material does not adversely effect the silicon nitride mass during processing. The high-temperature stable silicon nitride-containing material may be, e.g., reaction bonded silicon nitride or a composite of silicon nitride and a material selected from the group consisting of boron nitride, tungsten, molybdenum, tungsten nitride, tungsten carbide, molybdenum carbide, molybdenum nitride, molybdenum silicide, tungsten silicide, and silicon carbide. In the composites, the high-temperature stable silicon nitride-containing material is at least about 5 weight percent silicon nitride, more preferably at least about 20 weight percent, and most preferably at least about 50 weight percent silicon nitride. One way of forming a silicon nitride/boron nitride composite is by preforming a blend of silicon powder and boron nitride powder, then nitriding the preform. The silicon nitride formed acts to bond the boron nitride together. Another way of forming a silicon nitride/boron nitride composite is by preforming a blend of boron powder and silicon powder, then nitriding the preform. It is preferred that, if the silicon nitride-containing material is a composite of silicon nitride and another material, the silicon nitride is generally homogeneous throughout the composite. Preferably, the sinter box is formed of predominantly silicon nitride. In this context, "predominantly" means at least about 70 volume percent.

To make a sinter box of reaction bonded silicon nitride, a mixture of silicon particles and nitriding agents are compacted into the desired shapes to form the sinter box and nitrided by exposing the compacted silicon to a nitrogen-containing atmosphere while heating the compact to about 1400° C. The method of U.S. Pat. No. 5,187,129 may be used for preparing such silicon nitride sinter boxes. Preferably, substantially all of the silicon of the sinter box and auxiliary pieces is converted to silicon nitride prior to use, especially at the locations on the sinter box that contact the greenware article or powder to avoid possible "gluing" of the silicon nitride article or powder to unreacted silicon of the sinter box or auxiliary pieces during conversion from alpha-phase to beta-phase. For maximum stability, it is preferred that the majority of the sinter box or the material which makes the sinter box does not contain any sintering aids. The sinter box and auxiliary parts should be thick enough to provide structural stability through repeated operations. Sinter boxes having wall thicknesses of $\frac{1}{8}-\frac{1}{4}"$ thick have been found satisfactory.

Various shapes of sintering vessels and auxiliary pieces will work in this invention, as well as other variations on the design. For example, the sinter box may be used in the reverse of what is shown in FIGS. 1–3 in that the sinter box could rest on top surface 16, article 36 may be placed inside lid 14, and base 12 may then be placed on top of lid 14 to close opening 22. In other words, the base portion could then have the opening for placement of a silicon nitride article and a vertical wall or walls for surrounding the sides of the article, and the lid portion could be generally flat and used to place on top of the base portion opening to close the opening. Additionally, the sinter vessel may be cylindrically- or triangularly-shaped, etc. If the vessel is cylindrically-shaped, the lid portion may be cylindrically-shaped with a circular opening, and the base portion may be flat and circularly-shaped with a circular raised portion to match the opening in the lid.

Figure 4:
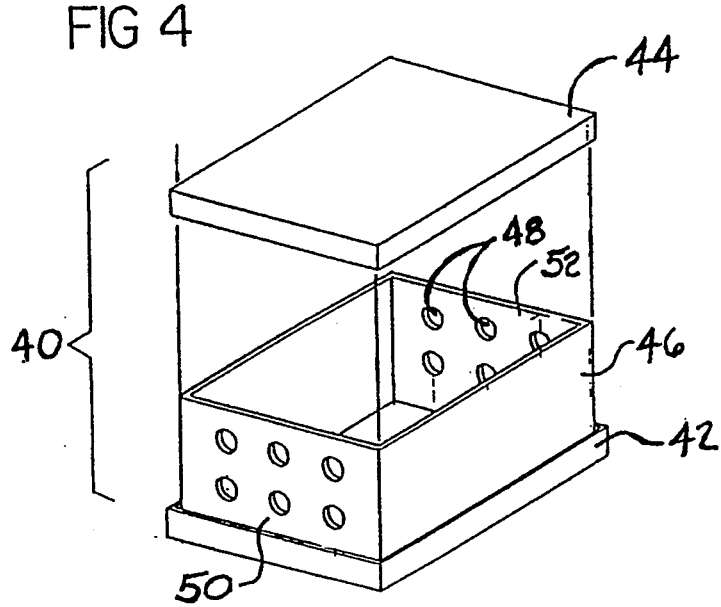
FIG. 4 shows a perspective view of an alternative design for a sinter box which may be used in the present invention which is nested in a refractory tray.

Another alternative design to the sinter box is shown in FIG. 4 and designated by reference numeral 40. Sinter box 40 is nested in refractory boat 42 and has lid 44 and base 46. Base 46 is an elongated box with an open top and has a plurality of holes 48 in two opposite ends 50 and 52. Refractory boat 42 may be formed of, e.g., refractory metal, such as molybdenum, tungsten, or tantalum.

During conversion operations, when, e.g., the furnace is formed of graphite, the outside of the sinter box acts as a sacrificial reactive site so that the silicon nitride article contained within does not react with the furnace material. As a sacrificial piece, the outside of the sinter box converts, forming a layer of silicon carbide.

The Furnace

Figure 5:
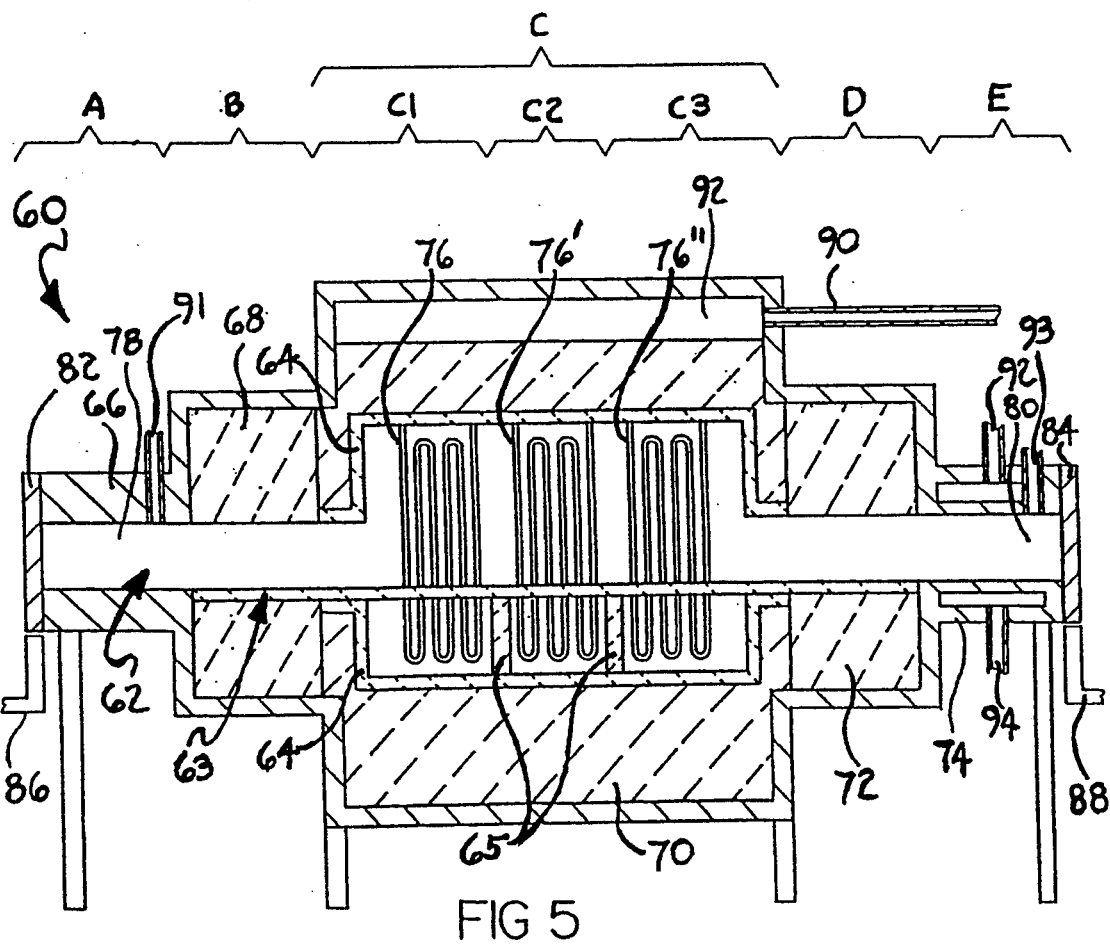
FIG. 5 shows a cross-sectional side view of a furnace which may be used in the present invention.

FIG. 5 shows a cross-sectional side view of a conventional pusher furnace 60 such as the pusher furnaces manufactured by CM Furnaces of Bloomfield, N.J., which may be used in the method of this invention. Furnace 60 has hearth tunnel 62 therethrough, within which the silicon nitride mass to be heated traverses.

Referring to portions of hearth tunnel 62 from left to right, hearth tunnel 62 has 1) an unheated zone "A" enclosed by enclosure 66 which may be formed of a metal, such as steel, 2) an unheated zone "B" enclosed by enclosure 68 which is formed of refractory brick, 3) a heated zone "C" enclosed by the refractories of enclosure 70 which is formed of refractory brick and refractory lining 64, 4) an unheated zone "D" enclosed by enclosure 72 which is formed of refractory brick, and 5) a water-cooled zone "E" enclosed by enclosure 74 which may be formed of a metal, such as steel. For cooling water-cooled zone "E", zone "E" is equipped with inlet pipe 92 and outlet pipe 94, through which water enters and exits, respectively. Heated zone "C" has three sets of tungsten heating elements 76, 76', and 76" which are independently controlled so that they define three heating zones within heated zone "C", referenced "C1", "C2", and "C3".

The heated zone C of hearth tunnel 62 is enclosed by refractory lining 64 and has hearth 63 at the bottom thereof which is supported by pillars 65. Refractory lining 64, hearth 63, and pillars 65 may be formed of Norton 599 aluminum oxide refractory available from Norton, Worcester, Mass. Silicon nitride, graphite, silicon carbide, and mixtures thereof may be used in place of the aluminum oxide refractory. When the refractory lining contains aluminum oxide or graphite, it is preferred that the silicon nitride mass to be heated in the furnace is placed in a sinter box which is placed in a refractory boat, as discussed hereinabove. The refractory boat, being formed of refractory metal, protects the silicon nitride sinter box from reacting with hearth 63 of the furnace, while the silicon nitride sinter box protects the silicon nitride mass from reacting with the refractory lining 64.

Hearth tunnel 62 has entrance end 78 and exit end 80 equipped with doors 82 and 84, respectively. At the entrance and exit ends, there are natural gas supplies 86 and 88, respectively. During operation, natural gas supplies 86 and 88 are burning, so that when doors 82 and 84 are opened, any exiting combustible gases are burned and air does not enter the furnace.

Furnace 60 is equipped with supply pipe 90 which can supply gases, such as nitrogen and hydrogen. Gases supplied by pipe 90 enter space 92 in furnace 60 and pass through the porous refractory brick and lining and into hearth tunnel 62 and exit furnace 60 through doors 82 and 84, which are purposely loose-fitting to allow the gases to exit. By gases entering through pipe 90, furnace 60 is operated at a positive pressure, slightly above atmospheric pressure. The positive pressure helps assure that no air enters furnace 60. To further insure that air does not enter the furnace, entrance end 78 and exit end 80 are equipped with high-flow hydrogen gas ports 91 and 93, respectively, such that when door 82 or door 84 is opened, a high flow of hydrogen gas is admitted to the respective entrance end 78 or exit end 80, thus flushing out any air which may attempt to enter the furnace.

During use, pusher furnace 60 may be used in a manually-operated continuous manner in which refractory boats carrying silicon nitride masses to be fired are traversed on hearth 63 along a longitudinal path of travel through hearth tunnel 62. One way to operate furnace 60 is described in Example 1 below.

Other types of furnaces may be used in this invention, such as car bottom furnaces, belt-link furnaces, roller hearth furnaces, walking beam kilns, and railroad kilns. Batch-type furnaces outfitted with controlled atmosphere containment provisions may also be used in this invention. Batch-type vacuum furnaces which have provisions for sealing when a positive pressure is present may be utilized successfully in this invention. Batch-type vacuum furnaces which are able to contain significant positive nitrogen pressures of 45-2050 KPa (50-300 psig) may be successfully used for conversion and densification at higher temperatures such as those required for compositions comprising yttria densification additives. Non-sealing batch furnaces with provisions for continuous flow of nitrogen or nitrogen-hydrogen mixtures and provisions for burn-off may also be employed in this invention.

Combining Conversion Step with Other Processes

The process of this invention entails converting a non-densified alpha-phase silicon nitride mass to a densified or nondensified beta-phase silicon nitride mass. Processes other than the conversion from alpha-phase to beta-phase silicon nitride may be performed in one furnace without breaking atmosphere. For example, greenware articles of silicon and other additives, such as nitriding agents, densification aids, and organic additives, such as dispersing agents, binders, plasticizers, and viscosity modifiers, may be placed in the furnace to burn off organic additives and to nitride the silicon. The burn-off process is preferably performed at a temperature up to about 1000° C. in a hydrogen atmosphere for about 2 hours.

Nitridation of the silicon is preferably performed by increasing the temperature from the burn-off temperature to a temperature of from about 1350° to about 1450° C. in a nitriding atmosphere. Since it is desirable to minimize or eliminate the amount of oxygen in the furnace during nitridation, unheated zone A of the above-described pusher furnace could be replaced with a module having a vestibule entrance, burn-off section, and nitridation section. The entrance to the continuous nitridation/sintering furnace would preferably be the vacuum vestibule interlock-type entrance. In one process using the vestibule interlock-type furnace, the mass of silicon being processed into silicon nitride, settered in its silicon nitride sinter box, would enter the furnace through the entrance vestibule which would initially contain normal room air or nitrogen. The entrance door would close, the vestibule would be evacuated to about $10^{-3}$ torr or less vacuum, at which point the evacuation would be stopped, and the vestibule would be back-filled with hydrogen or nitrogen. The vestibule exit door would then open and the settered mass of silicon would be transferred to the burn-off section of the furnace. The vestibule exit door would then close, the vestibule would be evacuated and refilled with room air or nitrogen and the process repeated. This method would allow for the continuous throughput of silicon material into the furnace. The pusher furnace would further be modified with incorporation of a burn-off heating zone immediately after the vacuum vestibule and a nitridation heating zone immediately following the burn-off zone which would connect to zone B or zone C of the previously-described pusher furnaces.

To ensure that the greenware article is exposed to the desired temperatures and atmospheres for the desired lengths of time, the furnace design is selected and its operations are controlled. The desired temperatures are achieved by location and control of the heating elements of the furnace, the amount, location, and material of insulation, and the cooling capacity at the exit end of the furnace. The desired atmospheres are achieved by location and quantity of incoming gases, such as hydrogen, helium, and nitrogen. The articles are exposed to the desired temperatures and atmospheres for desired lengths of time by controlling the speed in which the articles traverse through the various zones of the furnace.

In most instances, the nitriding atmosphere preferably comprises 1-10% hydrogen and 90-99% nitrogen, without helium. For heavily-loaded furnaces, however, the nitriding atmosphere is preferably from about 40 to about 60 mole percent nitrogen, from about 40 to about 60 mole percent helium, and from about 1 to about 6 percent hydrogen. The preferred resulting partial pressure of the above-described nitriding atmosphere constituents are nitrogen, helium, and hydrogen at 48%, 50% and 2%, respectively.

For nitridation, it is preferred that the silicon experiences conditions in which the temperature is increased from about 1000° C. to a nitriding temperature of between 1350° C. and 1450° C., preferably about 1420° C., at a linear rate of about 5° C. to 50° C./hr, although 15° C. to 25° C. per hour is most preferred. During this heating regimen, nitrogen is consumed by the silicon to form silicon nitride. The nitriding atmosphere composition in the furnace atmosphere is kept substantially constant by monitored addition of substantially pure nitrogen gas into the furnace at the nitriding locations to maintain the slightly greater than atmospheric pressure. Once the upper nitriding temperature is reached, the temperature is maintained for less than 2 hours.

After the nitriding step, a next step to convert the resultant alpha-phase silicon nitride mass at a conversion temperature of, typically, from about 1450° C. to about 2100° C. is performed. If the silicon nitride mass contains densification agents in an sufficient amount to cause densification, the conversion to beta-phase also densifies the material. If the silicon nitride mass does not contains densification agents in a sufficient amount to cause densification, the conversion forms non-densified beta-phase silicon nitride. The conversion generally includes utilizing at least a nitrogen-containing atmosphere, and more specifically, may include nitrogen; nitrogen and helium; nitrogen and hydrogen; or nitrogen, helium and hydrogen.

It is preferred that the conversion and densification step be accomplished by heating from the temperature achieved at the end of the nitriding step at an increasing rate of from about 100° C. to about 1250° C. per hour until an elevated temperature of about 1450° C. to about 2100° C. is reached. The temperature may increase at a rate from about 300° C. to about 1000° C. per hour until the elevated temperature is reached. Preferably, the increasing rate is about 300° to 500° C. per hour until the elevated temperature is reached. The conversion and densification step is completed by maintaining a conversion and densification temperature of between about 1450° C. to about 2100° C., and preferably between about 1650° C. to about 1850° C. until substantially all of the silicon nitride in the alpha phase is converted to non-densified beta-phase or densified beta-phase silicon nitride. The conversion temperature is maintained for about 0.3 to about 20 hours until substantially all of the conversion takes place, preferably from about 1 to about 10 hours, and most preferably, between about 1 to 4 hours.

After the conversion step, a cooling down step may also be included which cools the resulting silicon nitride mass from the conversion temperature back to room temperature at a rate of from about 250° C. to about 1250° C. per hour, preferably from about 500° C. to about 1000° C. per hour, more preferably at about 500° C. per hour until room temperature is reached.

Alternatively, after the conversion step, the silicon nitride mass may be cooled and then heat treated to a temperature of at least about 1500° C. Thereafter, the heat-treated silicon-nitride mass may be cooled.

Pressure Considerations

Silicon nitride materials decompose at temperatures starting above 1700° C. There are advantages to using densification additives which require sintering at temperatures as high as 2100° C. to produce resultant densified silicon nitride bodies with resultant high temperature properties useful for turbine applications. At these high temperatures, the method of this invention using silicon nitride sintering boxes and continuous sintering would need to be conducted at high nitrogen partial pressures, e.g., as high as 3,000 KPa (500 psig). For these elevated pressures, the furnace would need to be encased in a high-pressure vessel suitable for maintaining the required high nitrogen partial pressure. The operation of the above-described pusher furnace in an underwater oceanographic facility would provide an appropriate high ambient pressure environment allowing high nitrogen partial pressures without the need for an integral high pressure shell for the furnace.

Furnace with Special Lining

Another embodiment of this invention entails a furnace for converting silicon nitride from a predominantly alpha-phase material to a predominantly beta-phase material which inhibits the silicon nitride from thermally decomposing or reacting with the furnace interior. The furnace includes a) an interior conversion zone having a lining formed of a silicon nitride-containing material which is stable at temperatures of at least about 1700° C. and is compatible with silicon nitride; b) means for heating the interior conversion zone to a temperature of at least about 1450° C.; and c) means for providing a selected gas into the atmosphere of the interior conversion zone. The specially-lined furnace may be a pusher furnace as described hereinabove. The furnace may also be designed so that the interior conversion zone is capable of moving relative to the silicon nitride mass.

In one design of the furnace of this invention, the furnace also has an interior nitriding zone located in operational sequence before the conversion zone for nitriding silicon masses. The nitriding zone should be equipped with means for heating the interior nitriding zone to a temperature of from about 1350° to about 1450° C. The furnace may further have an interior burn-off zone located in operational sequence before the nitriding zone for burning-off organic materials in a silicon mass prior to nitriding. The burn-off zone should be equipped with means for heating the burn-off zone to a temperature of up to about 1000° C.

The furnace may also have an interior low-temperature zone located in operational sequence after the conversion zone for cooling the silicon nitride masses from the conversion temperature to a lower temperature. The low-temperature zone should be equipped with means for heating the low-temperature zone to a temperature above 25° C. and less than the temperature of the conversion zone. In operation sequence after the low-temperature zone, the furnace may have an interior post-conversion heat treatment zone. The post-conversion heat treatment zone should be equipped with means for heating the zone to a temperature of at least about 500° C.

Finally, the furnace may have an interior cooling zone located in operational sequence after the post-conversion heat treatment zone. The cooling zone is typically equipped with chambers through which cooling water may flow to cool the cooling zone.

The use of this furnace during conversion of silicon nitride eliminates the need for the closed walled container discussed hereinabove. Otherwise, the methods discussed above may be performed in this specially-lined furnace with the materials discussed above.

The material forming the lining of the furnace in this embodiment may be silicon nitride, e.g., reaction bonded silicon nitride, or a composite of silicon nitride and silicon carbide. If the lining is a composite of silicon nitride and silicon carbide, the lining is preferably at least about 50 weight percent silicon nitride. Preferably, the lining is formed of predominantly silicon nitride. In this context, "predominantly" means at least about 70 volume percent. Preferably, the lining is at least about $\frac{1}{8}$" thick, more preferably, at least about $\frac{1}{2}$" thick, and, most preferably, at least about 1" thick.

The Product

The densified and non-densified beta-phase silicon nitride masses which result from the methods or are prepared in the furnace of this invention are expected to find particular utility in applications which require a material having high-temperature stability.

The silicon nitride material prepared by the method of this invention is capable of having more consistent physical and chemical properties throughout the bulk such that the material can have average four-point flexural strengths greater than about 450 MPa (65 KSI) and a Weibul slope of at least 20. The average flexural strength and Weibul slope are determined using a minimum of 30 test bars of the material which are tested in four-point bending per ASTM C1161, specimen size B.

The silicon nitride material prepared by the method of this invention may include at least one densification aid selected from the group consisting of rare earth metal oxides, MgO, $ZrO_2$, $TiO_2$, BaO, SrO, $Sc_2O_3$, $B_2O_3$, BeO, $Cr_2O_3$, CaO, $V_2O_5$, $MnO_2$, MgN, AlN, $Al_2O_3$, MgSi, $MgAl_2O_4$ and mixtures thereof.

Thus, there is provided in accordance with the present invention, an economical method of converting alpha-phase silicon nitride to beta-phase silicon nitride which a) inhibits the silicon nitride from thermally decomposing or reacting with furnace materials during conversion without using setter powder, b) gives protective coverage to the silicon nitride during the conversion operation and which is easy to use, readily reusable, and which does not require any additional steps of operation; c) does not experience the problems of using setter powder, and d) may be a continuous operation using conventional continuous furnaces.

Also provided by this invention is a furnace for converting alpha-phase silicon nitride to beta-phase silicon nitride which a) inhibits the silicon nitride from thermally decomposing or reacting with furnace materials during conversion without using setter powder, b) gives protective coverage to the silicon nitride during the conversion operation and which is easy to use, readily reusable, and which does not require any additional steps of operation; c) does not experience the problems of using setter powder, and d) may be used in a continuous fashion.

Also provided by the present invention is the formation of an improved silicon nitride material having high strength and more consistent properties throughout the bulk of the material.

The following examples are illustrative only and should not be construed as limiting the invention which is properly delineated in the appended claims.

EXAMPLES

Example 1

In this example, reaction bonded silicon nitride sinter boxes in molybdenum trays similar to that shown in FIG. 4 were used to carry Modulus-of-Rupture (MOR) bars formed of an unsintered sinterable silicon nitride composition through a pusher furnace similar to that shown in FIG. 5. The unsintered sinterable silicon nitride was prepared as detailed in U.S. Pat. No. 5,213,729, Example 3, through the nitridation step. Each molybdenum tray was 9" long.

The refractory lining of the hearth tunnel was formed of aluminum oxide. The furnace was operated so that the center of heating zone "C1" was about 1720° C., the center of heating zone "C2" was about 1730° C., and the center of heating zone "C3" was about 1720° C. Pipe 90 supplied about 20 CFH (cubic feet per hour) $N_2$ and from about 0.5 to about 1 CFH $H_2$. To begin the operation, a filled boat was placed just inside the entrance side of the furnace. After 20 minutes, the boat was pushed 3" along the hearth. After an additional 20 minutes, the boat was pushed another 3" along the hearth. After an another 20 minutes, which made it an hour after beginning the process, another filled boat was placed in the furnace. By placing another boat in the furnace, the first boat was pushed an additional 3" along the hearth, as each boat is 9" long. The boats were moved 3" every 20 minutes, adding another boat every hour. The length of the furnace allowed 12 boats to be inside the furnace at any one time. Once the furnace was filled, adding another boat at the entrance end, pushed a boat out the exit end of the furnace. The exiting boat, having gone through the water-cooled zone, had a temperature of about 100°–200° C. This process was repeated until 75 MOR bars of densified beta-phase silicon nitride were prepared.

The 75 MOR bars were ground by Chand Associates, Worcester, Mass., and tested in four-point flexure tests in accordance with ASTM C1161-90, specimen size B. The average strength of the MOR bars was determined to be 76,229 psi with a standard deviation of 3,519 psi and a Weibull slope of 25.55.

Example 2

The process as described in Example 1 was repeated for 4 days and 5 hours in which over 1500 MOR bars and many other alpha-phase silicon nitride objects were converted to densified beta-phase silicon nitride.

While my invention has been described in terms of a few specific examples and configurations, it will be appreciated that other forms could readily be adapted by one skilled in the art. Accordingly, the scope of my invention is to be considered limited only by the following claims.

What is claimed is:

1. A method of converting silicon to beta-phase silicon nitride, comprising:

heating, in a furnace having first, second, and third heated zones having pressures above atmospheric pressure, a walled container enclosing silicon while traversing through the first heated zone having a hydrogen atmosphere and a temperature up to about 1000° C. for burning off organic additives in the silicon to form burned-off silicon;

heating the walled container containing burned-off silicon while traversing through the second heated zone having a temperature of from about 1350° to about 1450° C. and a nitriding atmosphere for nitriding the burned-off silicon to form a predominantly alpha-phase silicon nitride mass;

and heating the walled container containing predominantly alpha-phase silicon nitride mass while traversing through the third heated zone for a sufficient length of time to convert the predominantly alpha-phase silicon nitride mass to a predominantly beta-phase silicon nitride mass, the third heated zone having an atmosphere containing nitrogen and temperature of from about 1450° to about 2100° C., the walled container being formed of a silicon nitride-containing material which is stable at temperatures of at least 1700° C., the walled container having an opening therein to allow placement of the silicon therein.

2. The method of claim 1, wherein the silicon is in the form of a greenware article.

3. The method of claim 1, wherein the temperature of the third heated zone is from about 1700° C. to about 2100° C.

4. The method of claim 1, wherein the sufficient length of time is from about 20 to about 500 minutes.

5. The method of claim 1, further comprising cooling the walled container containing the predominantly beta-phase silicon nitride mass while traversing through a cooled zone in the furnace.

6. The method of claim 1, further comprising cooling the walled container containing the predominantly beta-phase silicon nitride mass while traversing through a cooled zone in the furnace at a rate of from about 250° C. to about 1250° C. per hour.

7. The method of claim 1, further comprising cooling the walled container containing the predominantly beta-phase silicon nitride mass while traversing through a cooled zone in the furnace at a rate of from about 500° C. to about 1000° C. per hour.

8. The method of claim 1, wherein the furnace has an entrance end and an exit end and outside the furnace at both the entrance end and the exit end are burning natural gas supplies so that, when either the entrance end or the exit end of the furnace are opened, any exiting combustible gases are burned.

9. The method of claim 1, wherein the furnace has an entrance end and an exit end and inside the furnace at both the entrance end and the exit end are hydrogen gas ports controlled such that, when either the entrance end or exit end are opened, a flow of hydrogen gas is admitted to the respective end, flushing out any air attempting to enter the furnace.

10. The method of claim 1, wherein the furnace has a vestibule entrance having an entrance door and an exit door, the method further comprising, prior to heating the silicon in the first heated zone:
 opening the entrance door;
 placing the silicon into the vestibule entrance through the opened entrance door;
 closing the entrance door;
 evacuating the atmosphere in the vestibule entrance to a pressure of $10^{-3}$ torr or less;
 filling the vestibule entrance with a gas selected from the group consisting of hydrogen or nitrogen;
 opening the exit door of the vestibule entrance; and
 transferring the silicon from the vestibule entrance through the open exit door of the vestibule entrance and into the first heated zone.

11. A method of converting silicon to beta-phase silicon nitride, comprising:
 heating, in a furnace having first, second, and third heated zones and a cooled zone, the zones having pressures above atmospheric pressure, a walled container enclosing a greenware article formed of silicon while traversing through the first heated zone having a hydrogen atmosphere and a temperature up to about 1000° C. for burning off organic additives in the silicon to form burned-off silicon;
 heating the walled container containing burned-off silicon while traversing through the second heated zone having a nitriding atmosphere and a temperature of from about 1350° to about 1450° C. for nitriding the burned-off silicon to form a predominantly alpha-phase silicon nitride mass;
 heating the walled container containing predominantly alpha-phase silicon nitride mass while traversing through the third heated zone having an atmosphere containing nitrogen for a sufficient length of time to convert the predominantly alpha-phase silicon nitride mass to a predominantly beta-phase silicon nitride mass, the third heated zone having a temperature of from about 1700° to about 2100° C.; and
 cooling the walled container containing the predominantly beta-phase silicon nitride mass at a rate of from about 250° C. to about 1250° C. per hour while traversing through the cooled zone in the furnace, the walled container being formed of a silicon nitride-containing material which is stable at temperatures of at least 1700° C., the walled container having an opening therein to allow placement of the greenware article therein.

12. A method of converting silicon to beta-phase silicon nitride, comprising heating a walled container enclosing silicon in a furnace having a first heated zone having a hydrogen atmosphere and a temperature up to about 1000° C., a second heated zone having a nitriding atmosphere and a temperature of from about 1350° to about 1450° C., and a third heated zone having an atmosphere containing nitrogen and a temperature of from about 1450° to about 2100° C., the heated zones having pressures above atmospheric pressure and traversing relative to the walled container, the heating step including:
 heating the walled container containing silicon in the first heated zone for burning off organic additives in the silicon to form burned-off silicon;
 heating the walled container containing the burned-off silicon in the second heated zone of the furnace for nitriding the burned-off silicon to form a predominantly alpha-phase silicon nitride mass;
 and heating the walled container containing the predominantly alpha-phase silicon nitride mass in the third heated zone for a sufficient length of time to convert the predominantly alpha-phase silicon nitride mass to a predominantly beta-phase silicon nitride mass, the walled container being formed of a silicon nitride-containing material which is stable at temperatures of at least 1700° C., the walled container having an opening therein to allow placement of the silicon therein.

13. The method of claim 12, further comprising cooling the walled container containing the predominantly beta-phase silicon nitride mass in a cooled zone in the furnace, the cooled zone traversing relative to the walled container.

14. The method of claim 12, further comprising cooling the walled container containing the predominantly beta-phase silicon nitride mass in a cooled zone in the furnace at a rate of from about 250° C. to about 1250° C. per hour, the cooled zone traversing relative to the walled container.

15. The method of claim 12, further comprising cooling the walled container containing the predominantly beta-phase silicon nitride mass in a cooled zone in the furnace at a rate of from about 500° C. to about 1000° C. per hour, the cooled zone traversing relative to the walled container.

16. The method of claim 12, wherein the silicon is in the form of a greenware article.

17. The method of claim 12, wherein the furnace has an entrance end and an exit end and outside the furnace at both the entrance end and the exit end are burning natural gas supplies so that, when either the entrance end or the exit end of the furnace are opened, any exiting combustible gases are burned.

18. The method of claim 12, wherein the furnace has an entrance end and an exit end and inside the furnace at both the entrance end and the exit end are hydrogen gas ports controlled such that, when either the entrance end or exit end are opened, a flow of hydrogen gas is admitted to the respective end, flushing out any air attempting to enter the furnace.

19. The method of claim 12, wherein the furnace has a vestibule entrance having an entrance door and an exit door, the method further comprising, prior to heating the silicon in the first heated zone:
   opening the entrance door;
   placing the silicon into the vestibule entrance through the opened entrance door;
   closing the entrance door;
   evacuating the atmosphere in the vestibule entrance to a pressure of $10^{-3}$ torr or less;
   filling the vestibule entrance with a gas selected from the group consisting of hydrogen or nitrogen;
   opening the exit door of the vestibule entrance; and
   transferring the silicon from the vestibule entrance through the open exit door of the vestibule entrance and into the first heated zone.

20. A method of converting silicon to beta-phase silicon nitride, comprising:
   heating a walled container enclosing a greenware article formed of silicon in a furnace having a first heated zone having a temperature up to about 1000° C. and a hydrogen atmosphere, a second heated zone having a temperature of from about 1350° to about 1450° C. and a nitriding atmosphere, a third heated zone having a temperature of from about 1700° to about 2100° C. and an atmosphere containing nitrogen, and a cooled zone, the zones having pressures above atmospheric pressure and traversing relative to the walled container, the heating step including:
     heating the walled container containing silicon in the first heated zone for burning off organic additives in the silicon to form burned-off silicon;
     heating the walled container containing the burned-off silicon in the second heated zone of the furnace for nitriding the burned-off silicon to form a predominantly alpha-phase silicon nitride mass;
     heating the walled container containing the predominantly alpha-phase silicon nitride mass in the third heated zone for a sufficient length of time to convert the predominantly alpha-phase silicon nitride mass to a predominantly beta-phase silicon nitride mass; and
   cooling the walled container containing the predominantly beta-phase silicon nitride mass in the cooled zone in the furnace at a rate of from about 250° C. to about 1250° C. per hour, the walled container being formed of a silicon nitride-containing material which is stable at temperatures of at least 1700° C., the walled container having an opening therein to allow placement of the silicon therein.

* * * * *